(12) United States Patent
Cink et al.

(10) Patent No.: US 8,013,031 B2
(45) Date of Patent: Sep. 6, 2011

(54) EXTRUDED POLYLACTIDE FOAMS BLOWN WITH CARBON DIOXIDE

(75) Inventors: Kevin Cink, Brooklyn Park, MN (US); Jeffrey C. Smith, Woodbury, MN (US); James F. Nangeroni, Doylestown, PA (US); Jed Richard Randall, Minneapolis, MN (US)

(73) Assignee: NatureWorks LLC, Minnetonka, MN (US)

( * ) Notice: Subject to any disclaimer, the term of this patent is extended or adjusted under 35 U.S.C. 154(b) by 1231 days.

(21) Appl. No.: 10/593,111

(22) PCT Filed: Mar. 24, 2005

(86) PCT No.: PCT/US2005/009892
§ 371 (c)(1), (2), (4) Date: Sep. 14, 2006

(87) PCT Pub. No.: WO2005/097878
PCT Pub. Date: Oct. 20, 2005

(65) Prior Publication Data
US 2008/0262118 A1    Oct. 23, 2008

Related U.S. Application Data

(60) Provisional application No. 60/556,646, filed on Mar. 26, 2004.

(51) Int. Cl.
*C08J 9/08* (2006.01)
*C08J 9/00* (2006.01)
*C08J 9/04* (2006.01)

(52) U.S. Cl. .................. 521/97; 521/98; 521/60; 521/79

(58) Field of Classification Search .............. 521/97, 521/93, 60, 79
See application file for complete search history.

(56) References Cited

U.S. PATENT DOCUMENTS

| | | | |
|---|---|---|---|
| 5,134,171 A | * | 7/1992 | Hammel et al. ............... 521/98 |
| 5,210,108 A | | 5/1993 | Spinu |
| 5,225,521 A | | 7/1993 | Spinu |
| 5,238,968 A | * | 8/1993 | Morita et al. ................. 521/79 |
| 5,359,026 A | | 10/1994 | Gruber |
| 5,594,095 A | | 1/1997 | Gruber et al. |
| 5,798,435 A | | 8/1998 | Gruber et al. |
| 6,552,144 B1 | | 4/2003 | Campbell et al. |
| 6,605,681 B1 | | 8/2003 | Villalobos et al. |

FOREIGN PATENT DOCUMENTS

| | | | |
|---|---|---|---|
| EP | 1 528 079 | | 5/2005 |
| GB | 2277324 | | 1/1994 |
| JP | 2002-322309 | | 11/2002 |
| JP | 2003-073495 | * | 3/2003 |
| WO | WO 02/100921 A1 | | 12/2002 |

OTHER PUBLICATIONS

Takada et al., "Crystallization Kinetics of Poly(L-lactide) in Contact with Pressuried CO2", Polym. Eng. and Sci., 44:186-196, 2004.

* cited by examiner

*Primary Examiner* — Randy Gulakowski
*Assistant Examiner* — Kara Negrelli
(74) *Attorney, Agent, or Firm* — Gary C Cohn PLLC

(57) ABSTRACT

This invention provides a process for extruding a PLA resin using high levels of $CO_2$. Excellent quality, low density foam is produced easily and reproducibly. The foams are capable of being heat-annealed to induce significant crystallinity, even when an ordinarily amorphous PLA resin is used.

6 Claims, No Drawings

EXTRUDED POLYLACTIDE FOAMS BLOWN WITH CARBON DIOXIDE

CROSS-REFERENCE TO RELATED APPLICATION

This application is a national phase filing based on PCT/US2005/009892, filed 24 Mar. 2005. This application claims benefit of U.S. Provisional Patent Application 60/556,646, filed 26 Mar. 2004.

This invention relates to extruded polymer foams and processes for their preparation.

A common, inexpensive method for making insulation and packaging foams is through an extrusion process. Polystyrene insulation foam and polyethylene packaging foams are made in large commercial quantities using such a process. However, commercial extrusion processes are not easily adapted for use with a wide variety of polymers. Thus, although polystyrene, LDPE (low density polyethylene made in a high pressure process) and some grades of polypropylene are readily processed through an extrusion process, many other common polymers, notably LLDPE (linear low density polyethylene) and HDPE (high density polyethylene), can be extruded into foam with difficulty if at all.

Polylactide polymers (PLA, sometimes referred to as polylactic acid) have recently become available in commercial quantities. Attempts have been made to extrude this polymer into foam, but PLA foams with difficulty and good quality, low density extruded PLA foams have not become available. The difficulty in foaming PLA is believed to be due to its rheological properties, which is often expressed as "melt strength". To foam a stable foam, the resin must be of low enough viscosity that the blowing agent can expand the resin and form cells. At the same time, the resin must harden rapidly as it expands so the blowing agent does not escape quickly and cause the foam to collapse. Resins like PLA that have low melt strength usually can be foamed only within a very narrow range of processing temperatures, if at all. Under commercial scale production conditions, it is not feasible to maintain such narrow operating ranges.

Melt strength can be improved in several ways. Increasing molecular weight can improve melt strength, but this also increases shear viscosity, causing increased power consumption, lower processing rates and/or heavier, more expensive equipment. In addition, increasing molecular weight tends to increase the processing temperatures that are required. The higher processing temperatures increase polymer degradation, which is a particular concern in the case of PLA.

Another approach is to broaden the molecular weight distribution. This can be accomplished by introducing a small amount of long chain branching into the polymer. In the case of PLA, it has been attempted to copolymerize lactide with an epoxidized fat or oil, as described in U.S. Pat. No. 5,359,026, to treat PLA with peroxide, as described in U.S. Pat. Nos. 5,594,095 and 5,798,435, to use certain polyfunctional initiators as described in U.S. Pat. Nos. 5,210,108 and 5,225,621 to Spinu, GB 2277324 and EP 632 081 and to use bicyclic lactones as described in WO 02/100921A1.

Unfortunately, none of these methods has proven entirely satisfactory, and there remains a need to provide good quality extruded PLA foam.

In one aspect, this invention is a process that comprises forming a pressurized, molten mixture of a melt-processable polylactide (PLA) resin containing about 3 to about 15% by weight, based on the weight of the PLA resin, of carbon dioxide, and extruding the molten mixture through a die to a region of reduced pressure such that the carbon dioxide expands and the PLA resin simultaneously cools to form a stable foam.

In another aspect, is invention is a process that comprises forming a pressurized, molten mixture of a melt-processable amorphous polylactide (PLA) resin and carbon dioxide, adjusting the temperature of the mixture to a temperature above the glass transition temperature of the PLA resin but not above 120° C., and extruding the molten mixture through a die to a region of reduced pressure such that the carbon dioxide expands and the PLA resin simultaneously cools to form a stable foam. During this process, the carbon dioxide is advantageously introduced and maintained under supercritical conditions from the time of blending into the molten resin at least until it reaches the extrusion die.

Very high quality extruded foams are prepared in these processes. Densities as low as 1-2 pounds/cubic foot (pcf) can be obtained with good cell structure, good appearance and consistent quality. These results can be obtained using the inventive process, even in instances where the PLA is a linear, amorphous grade of resin that typically has low melt strength. Even greater processing latitude is achieved using a semi-crystalline PLA resin or a lightly branched, amorphous PLA resin having a higher melt strength.

The PLA resin used herein is a polymer or copolymer that contains at least 50% by weight of polymerized lactic acid repeating groups. The PLA resin may contain at least 80%, at least 90%, at least 95% or at least 99% by weight polymerized lactic acid units. When the PLA resin is a copolymer of lactic acid and another monomer, the other monomer can be any that will copolymerize with lactide. Preferred other monomers are hydroxycarboxylic acids, such as glycolic acid.

The lactic acid repeating units may be either the L- or D-enantiomer, or mixtures thereof. The ratio of the lactic acid enantiomers and the manner in which they are copolymerized (i.e., randomly, block, multiblock, graft and like) greatly influences the crystalline behavior of the polymer. Polymers that are very high in one enantiomer (i.e., 95% or more, especially 98% or more of one enantiomer) tend to be semi-crystalline. Polymers containing 5% or more of each enantiomer tend to be more amorphous.

A preferred PLA resin is a homopolymer (exclusive of any branching agents) of either L-lactic acid or D-lactic acid, a random copolymer of L-lactic acid and D-lactic acid, a block copolymer of lactic acid and D-lactic acid, or a mixture of two or more of these. Copolymers containing from 75-98% of one lactic acid enantiomer and from 2-25% of the other lactic acid enantiomer are particularly suitable PLA resins for use in this invention. A more preferred amorphous copolymer contains from about 85-96% of one enantiomer and 4-15% of the other enantiomer. An especially preferred amorphous copolymer contains from about 93-88% of one enantiomer and 7-12% of the other enantiomer. Enantiomer ratios are expressed in terms of lactic acid contents. Amorphous PLA resins can be blended with small quantities of semi-crystalline PLA resins (i.e., those made using preferably less than 2% of one lactic acid enantiomer) to improve melt rheology.

The molecular weight of the PLA resin is sufficiently high that the PLA resin is melt-processible. Number average molecular weights in the range from 10,000 to 200,000 are generally suitable. Number average molecular weights of about 30,000 to 100,000 are more preferred. Weight average molecular weights are preferably such that the $M_w/M_n$ ratio is in the range of 1.5 to about 2.5.

The PLA resin may be linear or branched. If branched, enough branching is introduced to produce a resin having a relative viscosity measured at 1 g/dL concentration in chloroform at 30° C., in the range of from about 1.5 to about 6. A suitable relative viscosity range is from about 2 to about 3.5. A preferred relative viscosity range is from about 2.3 to about 3.2. Branching can be introduced in various ways, including those already described in the art. For example, lactide may be copolymerized with an epoxidized fat or oil, as described in U.S. Pat. No. 5,359,026. A PLA resin may be treated with peroxide to introduce branching, as described in U.S. Pat. Nos. 5,594,095 and 5,798,435. Lactide may be polymerized using certain polyfunctional initiators as described in U.S. Pat. Nos. 5,210,108 and 5,225,521, GB 2277324 and EP 632 081. Lactide may be copolymerized with a bicyclic lactones as described in WO 02/100921A1. A PLA resin may also be reacted with polyfunctional branching agents that react with hydroxyl or carboxylic acid end groups on the PLA resin to couple individual polymer molecules together. Examples of such materials are compounds containing three or more epoxy, anhydride, oxazoline, isocyanate, carbodiimide, hydroxyl, tertiary phosphate, phthalimide or similar groups/molecule.

The PLA resin can be formed by polymerizing lactide. Lactide is a dimeric form of lactic acid, in which two lactic acid molecules are condensed to form a cyclic diester. Like lactic acid, lactide similarly exists in a variety of enantiomeric forms, i.e., "L-lactide", which is a dimer of two L-lactic acid molecules, "D-lactide", which is a dimer of two D-lactic acid molecules and "meso-lactide", which is a dimer formed from one L-lactic acid molecule and one D-lactic acid molecule. In addition, 50/50 mixtures of L-lactide and D-lactide that have a melting temperature of about 126° C. are often referred to as "D, L-lactide". Any of these forms of lactide, or mixtures thereof, can be copolymerized to form a PLA resin for use in this invention. The L/D ratio in the PLA resin is controlled through the ratio of these enantiomeric forms of lactide that are used in the polymerization. In an especially preferred process mixtures of L-lactide and meso-lactide are polymerized to form a polymer having a controlled level of D-lactic acid enantiomeric units. Suitable processes for polymerizing lactide to form PLA having controlled L/D ratios are described, for example, in U.S. Pat. Nos. 5,142,023 and 5,247,059, both incorporated herein by reference. Copolymerized branching agents may be added to the polymerization process.

If the PLA resin is to be branched following polymerization, a convenient way of accomplishing this is to melt the PLA in an extruder and feed the branching agent to the molten PLA resin through an extruder port. The branching reaction then takes place in the extruder barrel before cooling. The branching agent can also be added to the extruder during the foam extrusion process.

The blowing agent used in this invention is carbon dioxide. Carbon dioxide is preferably the sole blowing agent. However, a mixture of carbon dioxide and another blowing agent can be used as well to give different foam properties. Carbon dioxide is preferably supplied by introducing it as a pressurized gas or liquid into the barrel of the extrusion apparatus. Less preferably, carbon dioxide can be generated through the thermal decomposition of various types of chemical blowing agents, such as sodium bicarbonate and mixtures of bicarbonate sales and citric acid. Combinations of gaseous or liquid $CO_2$ and $CO_2$-generating chemical blowing agents can be used as well.

The carbon dioxide is most suitably introduced into the foaming mixture as a supercritical fluid, and maintained under supercritical conditions until the mixture exits the die, or immediately prior to exiting the die. Carbon dioxide is a supercritical fluid when its temperature and pressure are simultaneously at or above ~31.1° C. and ~72.9 atmospheres (~1071 psi or ~7392 kPa). The temperature and pressure of the molten mixture are preferably maintained under at least those conditions from the time the carbon dioxide and resin are first combined until the molten mixture exits the die. Because the molten mixture may pass through a chilled die, it is possible that its temperature may be reduced to below supercritical conditions (i.e., below 31.1° C.) just as it passes through the die. In most cases the supercritical conditions will be maintained until the mixture exits the die and begins to expand.

It is preferred to use at least 3% by weight of carbon dioxide, based on resin weight. It is more preferred to use at least 5% by weight $CO_2$, based on resin weight. Up to 15% or more by weight of $CO_2$ can be used. A preferred upper limit is 13.5% by weight $CO_2$. An especially preferred range is from 7-11% by weight $CO_2$.

The use of high levels of $CO_2$ as just described is believed to be important to forming good quality, low density extruded foam. Although the invention is not limited to any theory, it is believed that because $CO_2$ is somewhat soluble in PLA resin, at least under the pressure and temperature conditions that exist within the extruder, the solubized $CO_2$ plasticizes the PLA resin, thereby affecting its melt rheology. One benefit of this plasticization is that lower melt temperatures, as measured at the die, can be used in extruding the foam. Despite being somewhat soluble in the PLA resin in the extruder, the release of pressure and sudden cooling experienced as the molten mixture exits the die head causes the rapid release and expansion of the $CO_2$, and excellent foam expansion is achieved.

If desired, one may use a mixture of carbon dioxide and other physical blowing agents such as fluorocarbons, hydrofluorocarbons hydrocarbons, hydrochlorofluorocarbons, lower alkanols, alkyl chlorides or alkyl ethers. Blowing agents of these types are well known. Specific examples include R-134a, R-142a, R-153a, isobutane and pentane. However, there is usually little advantage in using another blowing agent in addition to the $CO_2$. Suitable chemical blowing agents that generate nitrogen or other gasses other than $CO_2$ can also be used in addition to $CO_2$, but this is usually not necessary.

The PLA resin is extruded into foam by melt processing it with carbon dioxide to form a pressurized molten mixture, extruding said molten mixture through an extrusion die to a region of reduced pressure, and allowing the molten mixture to expand and cool. Conventional foam extrusion equipment is entirely suitable for producing the foam. Thus, screw extruders, twin screw extruders and accumulating extrusion apparatus can all be used. Suitable processes for making extruded foams from resin/blowing agent mixtures are described in U.S. Pat. Nos. 2,409,910; 2,515,250; 2,669,751; 2,848,428; 2,928,130; 3,121,130; 3,121,911; 3,770,688; 3,815,674; 3,960,792; 3,966,381; 4,085,073; 4,146,563; 4,229,396; 4,302,910; 4,421,866; 4,438,224; 4,454,086 and 4,486,550. All of those processes are generally applicable for making extruded foam-according to this invention.

In the extrusion process, the PLA resin is heated to a temperature at or above its glass transition temperature or melting point. Suitable temperatures are at least 140° C., more preferably at least 160° C., but preferably no greater than 240° C., more preferably no greater than 200° C. The $CO_2$ is introduced under pressure (preferably under supercritical conditions as described before) and mixed into the heated PLA resin. Auxiliary foaming aids as discussed below are also blended into the melt. Pressures during the mixing step are maintained high enough so that foam expansion does not begin until the molten mixture passes through the extrusion die. As before, supercritical conditions are preferably maintained throughout the extrusions process.

After all components are blended, the molten mixture is usually adjusted to an extrusion temperature before being passed though the extrusion die to form the foam product. For amorphous PLA resins (i.e., less than 10% crystallinity), this temperature is typically 15-30 degrees C. above the glass transition temperature of the neat resin. This extrusion temperature is generally somewhat lower than the temperature at which the components are blended. For semicrystalline PLA resins (greater than 10% crystallinity), extrusion temperature is usually greater than 50° C. above the glass transition temperature. The required melt temperature will approach the melting temperature of the PLA resin in cases where the optical purity of the resin is very high. As before, pressures are suitably maintained so that the carbon dioxide remains in a supercritical state.

It has been found that with this invention, particularly low extrusion temperatures can be used to produce high quality foam from amorphous PLA resins. Extrusion temperatures (i.e., melt temperatures at the die head) are suitably as low as about 70° C. up to about 140° C. A preferred extrusion temperature is at least about 80° C. A still more preferred extrusion temperature is at least 85° C. A preferred maximum extrusion temperature is about 120° C. A more preferred maximum extrusion temperature is about 110° C. A most preferred range of extrusion temperatures is from 85-105° C.

These lower extrusion temperatures provide several benefits. Polymer viscosity and melt strength are improved at lower temperatures. This creates a broader processing window at those lower temperatures that permits easy, reproducible foaming. Resin degradation is also significantly reduced. In addition, power requirements are less due to the need to supply less heating.

Most commercial extrusion equipment has a series of separate heating zones which can operate independently at different temperatures. Typically, upstream zones where the components are mixed are operated at a higher temperature, and downstream cooling zone are set at lower temperatures to cool the molten mixture to the extrusion temperature. A die chiller may be used to control temperature at the die head itself. Mixing zone temperature settings are conveniently from about 190° C. to about 240° C., and cooling zone temperature settings are conveniently about 40 to about 130° C., especially from 50 to about 110° C. Note that these temperature settings do not reflect temperatures in the melt, which tend to be somewhat lower in the mixing zones and higher in the cooling zones.

After the temperature of the molten mixture is adjusted to the extrusion temperature, the mixture is passed through an extrusion die to an area of reduced pressure (usually atmospheric pressure). The loss of pressure causes the $CO_2$ to rapidly expand. The expansion of the blowing agent rapidly cools the PLA resin so the resin hardens as it expands, forming a stable foam.

The foam can be extruded into any variety of shapes, but will most commonly be extruded to form sheet (nominal thickness of 13 mm or less), plank (nominal thickness over 13 mm) or rod products. Sheet products are conveniently made using an annular slit die, producing a tubular foam that is slit longitudinally to form a flat sheet. Plank products are conveniently made using a rectangular or "dog-bone" die. Rods are made using a circular or elliptical die. The foamable mixture is preferably extruded to form a foam having, before any subsequent fabrication, a cross-sectional thickness of at least 1 mm, more preferably at least 3 mm, lost preferably at least 5 mm, up to 200 mm or more.

In addition, the molten mixture may be extruded through a die including a multiplicity of orifices arranged such that contact between adjacent streams of the molten extrudate occurs during the foaming process. This causes the contacting surfaces to adhere to one another well enough to result in a unitary structure. Methods for forming such coalesced strand foams are described in U.S. Pat. Nos. 6,213,540 and 4,824,720, both incorporated herein by reference. These coalesced strand foams tend to be highly anisotropic, with the highest compressive strengths generally being observed in the extrusion direction. The coalesced strand foam may include missing strands or designed voids, as described in U.S. Pat. No. 4,801,484, incorporated by reference herein.

Various auxiliary materials can be used in the foaming process. Common such auxiliary materials include nucleating agents, cell enlarging agents, stability control agents (permeability modifiers), antistatic agents, crosslinkers, processing aids (such as slip agents), stabilizers, flame retardants, ultraviolet absorbers; acid scavengers, dispersion aids, extrusion aids, antioxidants, colorants, inorganic fillers and the like. Nucleating agents and stability control agents are preferred.

Preferred nucleating agents include finely divided inorganic substances such as calcium carbonate, calcium silicate, indigo, talc, clay, mica, kaolin, titanium dioxide, silica, calcium stearate or diatomaceous earth, as well as small amounts of chemicals that react under extrusion conditions to form a gas, such as a mixture of citric acid or sodium citrate and sodium bicarbonate. The amount of nucleating agent employed may range from about 0.01 to about 5 parts by weight per hundred parts by weight of a polymer resin. The preferred range is from 0.1 to about 3 parts by weight, especially from about 0.25 to 0.6 parts by weight.

The expanded foam will typically have a density of below 18 pounds/cubic foot (pcf) ($288 \text{ kg/m}^3$), and most often below 5 pcf ($80 \text{ kg/m}^3$), as measured according to ASTM D-1622. Densities of about 1 to about 3.5 pcf ($16$-$54 \text{ kg/m}^3$) are preferred. Densities of about 1.3 to about 2.5 pcf ($20.8$-$40 \text{ kg/m}^8$) are most preferred for packaging and cushioning applications. The foam will typically have an average cell size of at least 0.01 mm, preferably at least 0.05 mm, and more preferably at least 0.1 mm; and advantageously no greater than 5 mm, preferably no greater than 4 mm and more preferably no greater than 3 mm, as measured according to ASTM D3576.

The closed cell content of the foam can vary according to the intended end-use application. For thermal insulating and many packaging applications, the foam is advantageously primarily a closed cell foam having at least 70%, preferably at least 85%, closed cells. For thermal insulation applications, the closed cell content is most preferably at least about 95%. When used in packaging and/or thermal insulation applications, the foam will often advantageously have a thin integral skin. For other applications, such as sound insulation or when a soft foam is needed, the closed cell content is advantageously below 70%, preferably below 50% and may be as low as essentially zero. Open (and closed) cell content is determined according to ASTM D2856-A.

The foam may be subjected to various subsequent processing steps if desired. It is often desired to cure closed-cell foams to accelerate the replacement of the blowing agent in the cells with air. This prevents foam shrinkage and preserves dimensional stability. Process steps intended to reduce the curing time include perforation, as described in U.S. Pat. No. 5,424,016, heating the foam at slightly elevated (100-130° F.

(38-73° C.)) temperatures for a period of days to weeks, or combinations thereof. In addition, the foam may be crushed in order to open cells.

Unless crosslinked, the foam is readily thermoformable or otherwise capable of being shaped under heat and mechanical pressure to a desired shape or contour, depending on the application. If desired, a decorative layer such as a fabric layer of woven thermoplastic fibers may be thermally welded or otherwise adhered to the foam during or after the thermoforming process. The foam may be laminated to other foam structures, films, or other substrates.

It has been found that foam made according to the invention using an amorphous PLA resin, is capable of becoming semi-crystallized if subjected to post-foaming heat treatment or heat annealing. This is particularly the case where low melt temperatures are used to process the foam. It is believed that the lower melt temperature, together with the plasticization effect of the carbon dioxide, permits the PLA resin to become oriented during gas expansion, to a greater degree than is usually achieved with an amorphous PLA resin. This orientation both strengthens the inherent foam structure and forms nucleation sites that permit further crystallization when the foam undergoes further heat annealing or heat treatment.

Heat annealing is conveniently performed at an elevated temperature, above the glass transition temperature but below the melting temperature of the PLA resin, for a period of from about 1 minute to about 24 hours, depending on the amount of crystallinity that is desired. A preferred heat annealing temperature is from about 60° C., preferably from about 90° C., to about 15° C., especially up to about 135° C. It has been found that crystallinity levels of 24 J/g or even higher can be imparted to the foam in this manner. This is the case even when an amorphous PLA resin containing 4-15% or more of each enantiomer is used to make the foam. In general, it is found that crystallinity levels of 10 J/g are developed within 2-20 minutes of heating, whereas further crystallinity develops somewhat more slowly up to about 20 J/g. Development of crystallinity above 20 J/g is yet slower. In general, crystallinity of up to about 24 J/g is preferred, especially from about 13 to about 20 J/g. Crystallinity prior to the heat annealing step is typically no more than 12 J/g, more typically less than 5 J/g and most usually about 2 J/g or below. Crystallinity is conveniently measured using differential scanning calorimetry (DSC) methods. A convenient test protocol for making DSC measurements is to heat a 5-10 milligram sample at 25-225° C. at 20° C./minute under air, on a Mettler Toledo DSC 821e calorimeter running Star V. 6.0 software.

As mentioned before, the foam of this invention is adapted for use in various applications. Closed celled foam panels according to the invention are useful as thermal building insulation or to insulate roofing, walk-in refrigerators and freezers, transportation devices, water heaters, storage tanks and the like. They are also useful in other insulation applications. Closed and open cell foams according to the invention can be used in a variety of packaging and cushioning applications such as electronics and consumer goods packaging. Softer foams according to the invention are useful as acoustical insulation. Rigid foams are useful for composite structure elements, lightweight panels and the like.

The following examples illustrate the invention, but are not intended to limit it in any way. ALL parts and percentages are by weight unless otherwise indicated.

EXAMPLES

PLA foams are prepared using the following general procedure:

The PLA resin is fed into the hopper end of a Leistritz 27-mm diameter twin screw extruder with co-rotating screws, equipped with 10 heating zones and a 2-mm circular rod die. A mixture of talc and liquid corn oil is separately blended with a mixing paddle until a uniform appearance is achieved and no free talc is visible. The talc mixture is added to the pellets at a rate of 0.5 phr (parts per hundred parts by weight resin). Liquid carbon dioxide is injected into the extruder barrel at specific rates as indicated below. Temperatures in zones 1-5 are set to provide polymer melting in order to get complete mixing of all components. Temperatures in zones 6-10 are set lower to bring the molten mixture to the desired extrusion temperature. Zone and extrusion temperatures are indicated below. The die is equipped with a chiller with a set point of 1° C. The melt pressure is as indicated below.

The PLA resins used in the following examples are described in Table 1.

TABLE 1

| Ex. No. | Resin Desig. | Resin Description | % D | $M_n^4$ | $M_w^4$ | R.V. |
|---|---|---|---|---|---|---|
| 1 | A | NatureWorks ® 6300[1] | 9.5 | 84,000 | 159,000 | 3.04 |
| 2A | B | NatureWorks ® 4060 resin[1] | 12.3 | 93,000 | 185,000 | 3.34 |
| 2B | C | Modified NatureWorks ® 4060 resin[2] | 12.3 | 105,000 | 342,000 | 4.2 |
| 3 | D | Peroxide-branched NatureWorks ® 8300 resin[3] | 11 | 98,000 | 254,000 | 3.89 |

[1]NatureWorks ® resins available from Cargill Dow LLC, Minnetonka, MN.
[2]A high die-swell variation of NatureWorks ® 4060 resin.
[3]Peroxide modification done by melt blending the PLA resin with hydrogen peroxide to induce branching.
[4]Molecular weights are reported relative to polystyrene standards, measured by gel permeation chromatography in tetrahydrofuran mobile phase with refractive index detection.

Example 1

Extrusion conditions for Example 1 are summarized in Table 2. Carbon dioxide is a supercritical fluid under the temperature and pressure conditions that are used.

TABLE 2

| | |
|---|---|
| Screw Speed, rpm | 53 |
| Melt Temp. ° C. | 101 |
| Pressure, psi (kPa) | 1173 (8088) |
| $CO_2$ addition rate, g/min. | 3 |
| $CO_2$ conc., % | 7.9 |
| Talc conc. % | 0.5 |
| Zone 1 Temp. | 190 |
| Zone 2 Temp. | 200 |
| Zone 3 Temp. | 210 |
| Zone 4 Temp. | 210 |
| Zone 5 Temp. | 150 |
| Zone 6 Temp. | 50 |
| Zone 7 Temp. | 50 |
| Zone 8 Temp. | 50 |
| Zone 9 Temp. | 50 |
| Zone 10 Temp. | 96 |
| Foam Dens., pcf (kg/m$^3$) | 2.03 (32.5) |

A good quality foam with a good appearance and desirable closed-cell structure is obtained.

Examples 2A-2B

Extrusion conditions for Examples 2A-2B are summarized in Table 3. The carbon dioxide is again maintained under supercritical conditions.

TABLE 3

| | Example No. | |
|---|---|---|
| | 2A | 2B |
| Screw Speed, rpm | 53 | 53 |
| Melt Temp. ° C. | 99 | 94 |
| Pressure, psi (kPa) | 1265 (8722) | 1541 (10,625) |
| $CO_2$ addition rate, g/min. | 3 | 3 |
| $CO_2$ conc., % | 7.9 | 7.9 |
| Talc conc. % | 0.5 | 0.5 |
| Zone 1 Temp. | 190 | 190 |
| Zone 2 Temp. | 200 | 220 |
| Zone 3 Temp. | 210 | 230 |
| Zone 4 Temp. | 210 | 230 |
| Zone 5 Temp. | 150 | 160 |
| Zone 6 Temp. | 50 | 60 |
| Zone 7 Temp. | 50 | 60 |
| Zone 8 Temp. | 50 | 60 |
| Zone 9 Temp. | 59 | 60 |
| Zone 10 Temp. | 96 | 90 |
| Foam Dens., pcf (kg/m$^3$) | 1.94 (31.0) | N.D. |

Each foam formulation processes well. These foam samples crush easily, having some open cell structure within the foam.

Example 3

Extrusion conditions for Example 3 are summarized in Table 4. Carbon dioxide is supercritical under these conditions.

TABLE 4

| Screw Speed, rpm | 53 |
|---|---|
| Melt Temp. ° C. | 93 |
| Pressure, psi (kPa) | 1426 (9832) |
| $CO_2$ addition rate, g/min. | 3 |
| $CO_2$ conc., % | 7.9 |
| Talc conc. % | 0.5 |
| Zone 1 Temp. | 190 |
| Zone 2 Temp. | 220 |
| Zone 3 Temp. | 230 |
| Zone 4 Temp. | 230 |
| Zone 5 Temp. | 160 |
| Zone 6 Temp. | 60 |
| Zone 7 Temp. | 60 |
| Zone 8 Temp. | 60 |
| Zone 9 Temp. | 60 |
| Zone 10 Temp. | 90 |
| Foam Dens., pcf (kg/m$^3$) | 15-17 (240-272) |

This foam formulation also processes well. Again, some open cell structure is seen within the foam samples.

Example 4

The crystallinity of Foam Example 1 is measured by heating a 5-10 milligram sample at 25-225° C. at 20° C./minute under air, on a Mettler Toledo DSC 821e calorimeter running Star V. 6.0 software, after storing at room temperature for several weeks. The measured crystallinity of the foam is about 12 J/g.

A sample of Foam Example 1 is heated for overnight at 100° C. and the crystallinity of the heat-treated sample is measured in the same manner. Crystallinity increases to 24.3 J/g.

What is claimed is:

1. A process that comprises forming a pressurized, molten mixture of a melt-processable polylactide resin containing about 5 to about 15% by weight, based on the weight of the polylactide resin, of carbon dioxide, and extruding the molten mixture at an extrusion temperature through a die to a region of reduced pressure such that the carbon dioxide expands and the polylactide resin simultaneously cools to form a stable foam, wherein the foam has least 70% closed cells and a crystallinity of about 13-24 J/g measured by differential scanning calorimetry, and wherein the polylactide resin contains at least 80% by weight polymerized lactic acid units.

2. The process of claim 1, comprising the further step of heat treating the foam to induce crystallinity.

3. The process of claim 2, wherein the polylactide resin contains a mixture of L- and D-enantiomers and the mixture of L- and D-enantiomers includes from about 85-96% by weight of one enantiomer and about 4-15% by weight of the other enantiomer.

4. A process that comprises forming a pressurized, molten mixture of a melt-processable polylactide resin containing 7-11% by weight, based on the weight of the polylactide resin, of carbon dioxide, and extruding the molten mixture at an extrusion temperature through a die to a region of reduced pressure such that the carbon dioxide expands and the polylactide resin simultaneously cools to form a stable foam having at least 70% closed cells, wherein the polylactide resin contains at least 80% by weight polymerized lactic acid units.

5. The process of claim 1, wherein the extrusion temperature is from from about 70 to about 140° C.

6. The process of claim 1 wherein the PLA resin contains long-chain branching.

* * * * *